United States Patent
Mochizuki

(10) Patent No.: US 9,671,081 B2
(45) Date of Patent: Jun. 6, 2017

(54) MARKER LAMP

(71) Applicant: Koito Manufacturing Co., Ltd., Tokyo (JP)

(72) Inventor: Yoshitake Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 1 day.

(21) Appl. No.: 14/927,809

(22) Filed: Oct. 30, 2015

(65) Prior Publication Data

US 2016/0146441 A1    May 26, 2016

(30) Foreign Application Priority Data

Nov. 20, 2014   (JP) .................................. 2014-235552

(51) Int. Cl.
*F21V 23/00* (2015.01)
*F21S 8/10* (2006.01)

(52) U.S. Cl.
CPC ......... *F21S 48/2243* (2013.01); *F21S 48/215* (2013.01); *F21S 48/2237* (2013.01); *F21S 48/2262* (2013.01); *F21S 48/2268* (2013.01); *F21S 48/2281* (2013.01); *F21S 48/2287* (2013.01)

(58) Field of Classification Search
None
See application file for complete search history.

(56) References Cited

U.S. PATENT DOCUMENTS

| | | | | |
|---|---|---|---|---|
| 5,400,225 A | * | 3/1995 | Currie | B60Q 1/0011 340/468 |
| 2008/0238649 A1 | * | 10/2008 | Arszman | B60Q 1/503 340/471 |
| 2015/0078025 A1 | * | 3/2015 | Kleiner | F21S 48/1241 362/511 |
| 2015/0210205 A1 | * | 7/2015 | Naber | B60Q 1/143 315/82 |

FOREIGN PATENT DOCUMENTS

JP          4979565 B      7/2012

\* cited by examiner

*Primary Examiner* — Douglas W Owens
*Assistant Examiner* — James H Cho
(74) *Attorney, Agent, or Firm* — Abelman, Frayne & Schwab

(57) ABSTRACT

According to the present disclosure, a first optical system includes a first light source and emits a first illumination light. A second optical system includes a second light source and emits a second illumination light. A controller controls turning-on/off of the first light source and the second light source. The first optical system and the second optical system are configured such that a first illumination standard is satisfied by the first illumination light and the second illumination light. The first optical system is configured such that a second illumination standard is satisfied by the first illumination light. The controller allows the turning-on of the first light source when the turning-on of the second light source is disabled, and prohibits the turning-on of the second light source when the turning-on of the first light source is disabled.

5 Claims, 6 Drawing Sheets

MARKER LAMP

CROSS-REFERENCE TO RELATED APPLICATIONS

This application is based on and claims priority from Japanese Patent Application No. 2014-235552 filed on Nov. 20, 2014, with the Japan Patent Office, the disclosure of which is incorporated herein in its entirety by reference.

TECHNICAL FIELD

The present disclosure relates to a marker lamp mounted on a vehicle.

BACKGROUND

As this kind of marker lamp, a configuration including a first light source, a second light source, and a light guide has been known (see, e.g., Japanese Patent No. 4979565). The light emitted from the first light source and the light emitted from the second light source are incident on the light guide. The light incident on the light guide is repeatedly reflected within the light guide and emitted as an illumination light from a predetermined emitting surface. The illumination light illuminates a predetermined illumination range based on a predetermined illumination standard. The illumination light is visually recognized by a pedestrian or a driver of a front vehicle, so that the presence of the vehicle on which the marker lamp is mounted is recognized.

The marker lamp having the configuration as described above cannot satisfy the predetermined illumination standard when turning-on of any one of the first light source and the second source is disabled for a certain reason. In such a case, a controller including a driver circuit of the first light source and the second light source is generally configured to prohibit turning-on of the other one of the first light source and the second light source. The marker lamp in which the illumination light is unable to be emitted will be repaired or replaced.

SUMMARY

An object of the present disclosure is to reduce the opportunities of repair or replacement of a marker lamp mounted on a vehicle.

In order to achieve the above-mentioned object, according to a first exemplary embodiment, the present disclosure provides a marker lamp mounted on a vehicle. The marker lamp includes a first optical system including a first light source and configured to emit a first illumination light; a second optical system including a second light source and configured to emit a second illumination light; and a controller configured to control turning-on/off of the first light source and the second light source. At least a part of an illumination range where a predetermined light intensity is obtained by the second illumination light is positioned outside an illumination range where the predetermined light intensity is obtained by the first illumination light. The first optical system and the second optical system are configured such that a first illumination standard is satisfied by the first illumination light and the second illumination light, the first optical system is configured such that a second illumination standard is satisfied by the first illumination light. The controller allows the turning-on of the first light source when the turning-on of the second light source is disabled, and prohibits the turning-on of the second light source when the turning-on of the first light source is disabled.

Here, the "first illumination standard" means, for example, a standard prescribed for illumination by a marker lamp during normal running of a vehicle. In addition, for example, in a case of performing illumination by a marker lamp including a plurality of light sources, the "second illumination standard" means a standard for prescribing illumination that is able to allow running continuation of a vehicle even if turning-on of some of the plurality of light sources is disabled. The present inventor has got an idea that the opportunities of repair or replacement of a marker lamp mounted on a vehicle may be reduced by using the second illumination standard.

As described above, the marker lamp includes the first optical system and the second optical system. The first optical system and the second optical system are configured such that the first illumination standard is satisfied by the first illumination light and the second illumination light. Meanwhile, the first optical system is configured such that the second illumination standard is satisfied by the first illumination light. The controller is configured to allow the turning-on of the first light source when the turning-on of the second light source is disabled. Meanwhile, the controller is configured to prohibit the turning-on of the second light source when the turning-on of the first light source is disabled.

That is, focusing on the second illumination standard, the present inventor divided the optical system included in the marker lamp into the first optical system and the second optical system, and configured the first optical system such that the second illumination standard was satisfied by the own illumination light (the first illumination light). Therefore, even if the turning-on of the second light source is disabled, it is not necessary to immediately prohibit the turning-on of the first light source. As long as the turning-on of the first light source is enabled, the running continuation of the vehicle based on the second illumination standard is still allowed afterward. Therefore, even if the turning-on of the second light source is disabled, it is not necessary to uniformly prohibit the turning-on of the first light source. Accordingly, the opportunities of repair or replacement of the marker lamp mounted on a vehicle may be reduced.

The marker lamp according to the first exemplary embodiment may be configured as follows. The maximum light intensity of the first illumination light is higher than the maximum light intensity of the second illumination light, and the illumination range where the predetermined light intensity is obtained by the second illumination light is wider in a horizontal direction than the illumination range where the predetermined light intensity is obtained by the first illumination light.

According to the above-described configuration, the illumination range where the predetermined light intensity is obtained by the first illumination light may be extended to a more distant place toward the front of the vehicle on which the marker lamp is mounted. In other words, the first illumination light may be visually recognized by a person positioned in a place more distant from the vehicle. Further, the illumination range where the predetermined light intensity is obtained by the second illumination light may be widened to a wider range in a horizontal direction of the vehicle on which the marker lamp is mounted. In other words, the second illumination light may be visually recognized by a person positioned in a wider angle range around the vehicle. Accordingly, in a case where the second illumination standard focuses on a visibility in a distant place, the second illumination standard may be easily satisfied by the first illumination light. Therefore, the opportunities of repair or replacement of the marker lamp may be further reduced.

In order to achieve the above-mentioned object, according to a first exemplary embodiment, the present disclosure provides a marker lamp mounted on a vehicle. The marker lamp includes a first light source; a second light source; and a light guide including a first portion and a second portion. The first portion includes a first incident surface and a first emitting surface. The second portion includes a second incident surface and a second emitting surface. The first incident surface is arranged such that the light emitted from the first light source is incident thereon. The second incident surface is arranged such that the light emitted from the second light source is incident thereon. The first portion is configured such that 50% or more of the light incident from the first incident surface is emitted from the first emitting surface without going through internal reflection. The second portion is configured such that 50% or more of the light incident from the second incident surface is emitted from the second emitting surface through internal reflection According to the above-described configuration, the light incident on the first incident surface may be efficiently emitted from the first emitting surface. Further, a directivity of the light emitted from the first emitting surface may be enhanced. Meanwhile, the light incident on the second incident surface is emitted from the second emitting surface to be widely diffused. That is, a light guide capable of emitting two kinds of illumination lights having different properties may be configured. The light emitted from the first emitting surface is suitable for use as the first illumination light described above. The light emitted from the second emitting surface is suitable for use as the second illumination light described above. Accordingly, the light guide may contribute to the reduction of the opportunities of repair or replacement of the marker lamp.

The marker lamp according to the second exemplary embodiment may be configured as follows. The first portion and the second portion are shaped as separate optical components.

According to the above-described configuration, an independent optical control is facilitated in the first portion and the second portion. Therefore, a light guide capable of emitting two kinds of illumination lights having different properties may be easily configured. When the first portion is configured such that the light emitted from the first emitting surface is suitable for use as the first illumination light described above, and the second portion is configured such that the light emitted from the second emitting surface is suitable for use as the second illumination light described above, the light guide may contribute to the reduction of the opportunities of repair or replacement of the marker lamp.

In this case, the marker lamp according to the second exemplary embodiment may have the following configuration. The first portion and the second portion are mechanically coupled.

According to the above-described configuration, the first portion and the second portion may be easily coupled while suppressing optical interference of both portions, as compared with a case where the first portion and the second portion are coupled by, for example, adhesion. Therefore, a light guide capable of emitting two kinds of illumination lights having different properties may be more easily configured.

The marker lamp according to the second exemplary embodiment may be configured as follows. The first light source is arranged so as to face the first incident surface.

According to the above-described configuration, since the light emitted from the first light source is easily incident directly on the first incident surface, the utilization efficiency of the light emitted from the first light source is improved. This enables light with high brightness and high directionality to be emitted from the first emitting surface. Such light is suitable for use as the first illumination light described above. Therefore, the light guide may contribute to the reduction of the opportunities of repair or replacement of the marker lamp.

The marker lamp according to the second exemplary embodiment may be configured as follows. The marker lamp further includes a reflective surface configured to reflect at least a part of the light that is emitted from the first light source but is not incident on the first incident surface, toward the first emitting surface.

According to the above-described configuration, the utility efficiency of the light emitted from the first light source may be further improved. This enables light with higher brightness to be emitted from the first emitting surface. Such light is suitable for use as the first illumination light described above. Therefore, the light guide may contribute to the reduction of the opportunities of repair or replacement of the marker lamp.

The above-described summary is illustration purposes only and does not intend to limit in any ways. In addition to the illustrative embodiment, examples, and features described above, additional embodiment, example, and features will become apparent by referring to the drawings and the following detailed description.

DETAILED DESCRIPTION

In the following detailed description, reference is made to the accompanying drawing, which form a part hereof. The illustrative exemplary embodiments described in the detailed description, drawings, and claims are not meant to be limiting. Other exemplary embodiments may be utilized, and other changes may be made, without departing from the spirit or scope of the subject matter presented here.

Meanwhile, the scales in respective drawings used in the following descriptions are properly changed so as to illustrate each member in a recognizable size. Further, the terms "right" and "left" as used in the following descriptions indicate the left and right directions when viewed from the driver's seat.

Figure 1A:
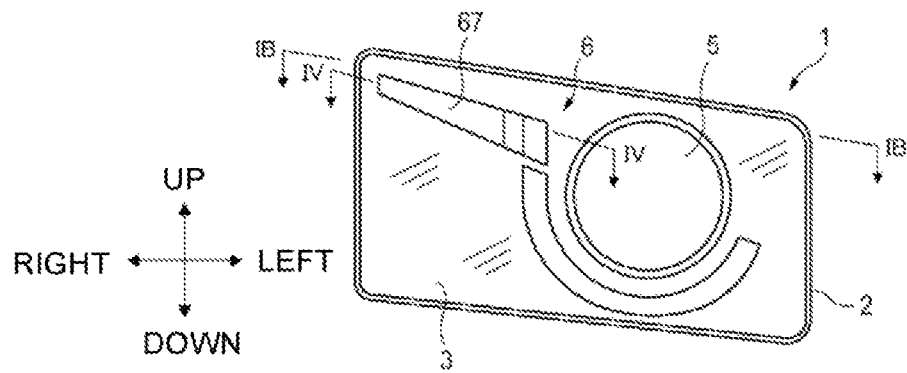
FIGS. 1A and 1B are views schematically illustrating a configuration of a marker lamp according to an exemplary embodiment.
Figure 1B:
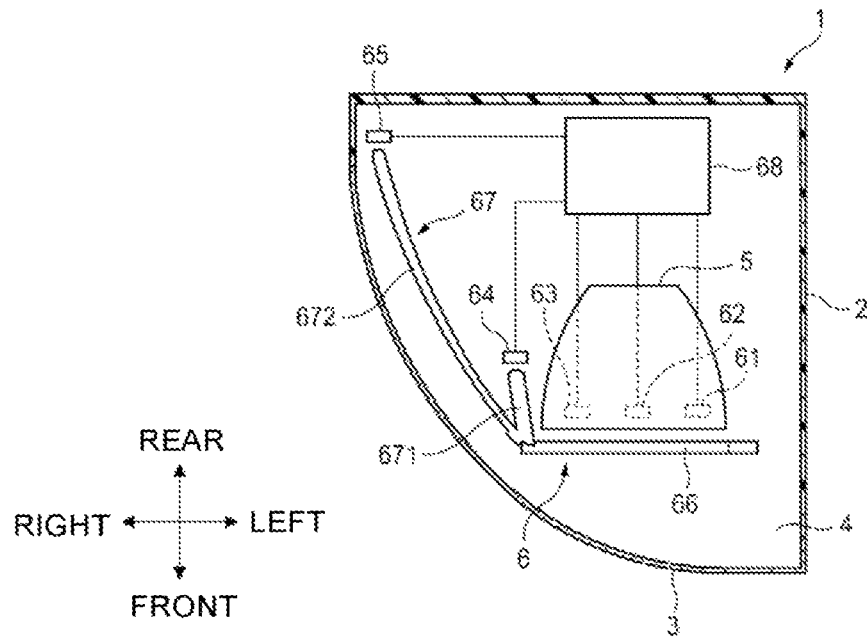

FIGS. 1A and 1B are views schematically illustrating a configuration of a right illumination device 1 according to an exemplary embodiment. FIG. 1A is a front view. FIG. 1B is a cross-sectional view when viewed from the top along line IB-IB in FIG. 1A. The right illumination device 1 is configured to be arranged in a right front portion of a vehicle. A left illumination device arranged in a left front portion of the vehicle has a shape bilaterally symmetrical to that illustrated in the drawing.

The right illumination device 1 includes a housing 2 and a translucent cover 3. The translucent cover 3 is mounted on the housing 2 to define a lamp chamber 4 therein. A right head lamp 5 and a right marker lamp 6 are arranged in the lamp chamber 4.

The right head lamp 5 forms a predetermined light distribution pattern in front of the right illumination device 1 to enable a driver to visually recognize the front side of the vehicle.

The right marker lamp 6 (an exemplary marker lamp) is, for example, a right clearance light. The right marker lamp 6 includes light sources 61 to 65, a first light guide 66, a second light guide 67, and a controller 68. The second light guide 67 includes a first portion 671 and a second portion 672. The light sources 61 to 63 are arranged behind the first light guide 66. The light source 64 is arranged behind the first portion 671 of the second light guide 67. The light source 65 is arranged behind the second portion 672 of the second light guide 67. Each of the light sources 61 to 65 may be constituted with either a single light emitting element or a plurality of light emitting elements which are connected in series.

The controller 68 is configured to control lighting-on/off of the light sources 61 to 65. The controller 68 is, for example, a control circuit including a driver circuit of the light sources 61 to 65.

The light sources 61 to 64 (an exemplary first light source), the first light guide 66, and the first portion 671 of the second light guide 67 constitute a first optical system. The light emitted from the light sources 61 to 63 is used for light guiding by the first light guide 66. The light emitted from the light source 64 is used for light guiding by the first portion 671 of the second light guide 67. The light emitted from the first light guide 66 and the first portion 671 of the second light guide 67 forms a first illumination light. That is, the first optical system emits the first illumination light.

The light source 65 (an exemplary second light source) and the second portion 672 of the second light guide 67 constitute a second optical system. The light emitted from the light source 65 is used for light guiding by the second portion 672 of the second light guide 67. The light emitted from the second portion 672 of the second light guide 67 forms a second illumination light. That is, the second optical system emits the second illumination light.

Figure 2:
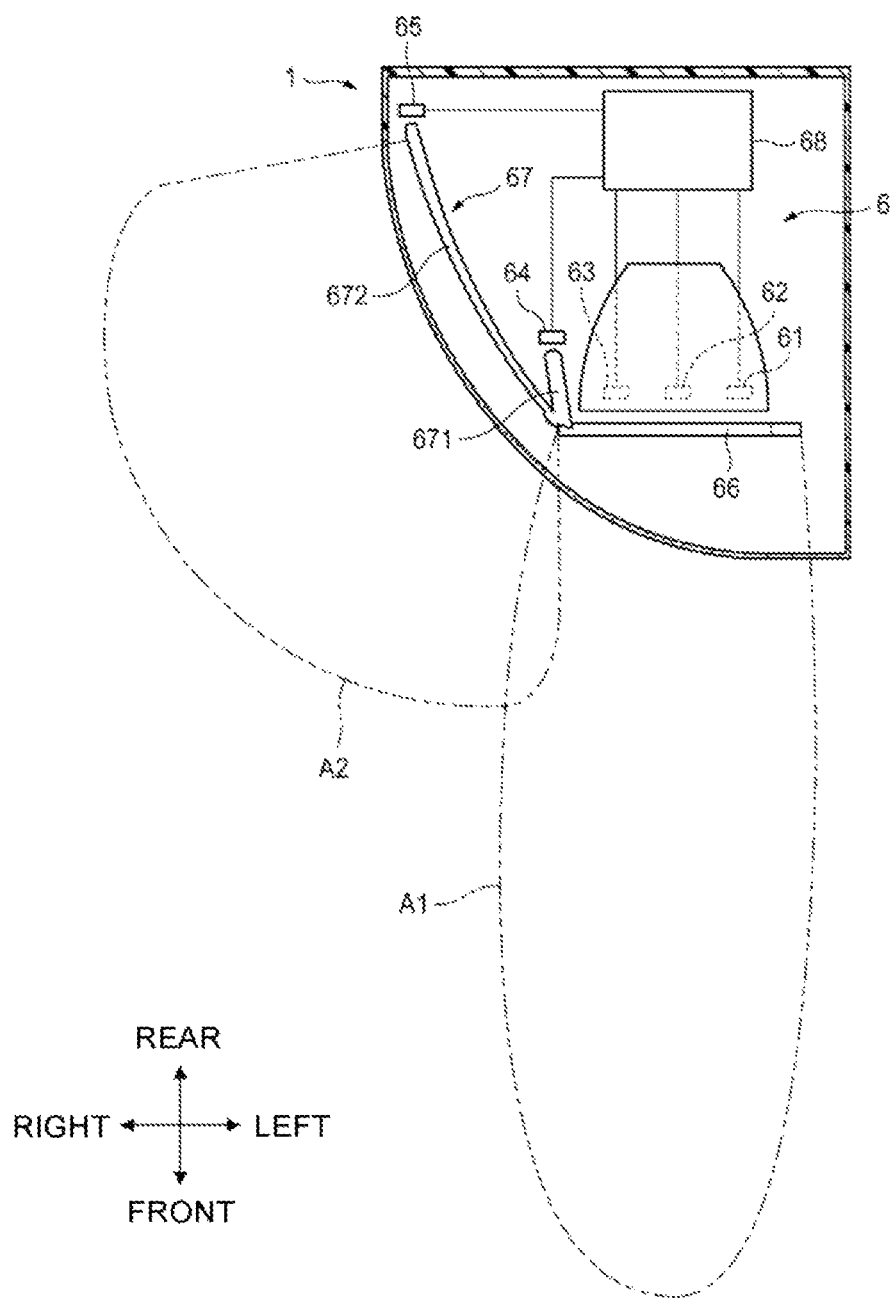
FIG. 2 is a view schematically illustrating an illumination range by the marker lamp.

FIG. 2 is a view schematically illustrating an illumination range A1 by the first illumination light and an illumination range A2 by the second illumination light emitted from the right marker lamp 6 as configured above. The "illumination range A1 by the first illumination light" means a range where a predetermined light intensity is obtained by the first illumination light. The "illumination range A2 by the first illumination light" means a range where a predetermined light intensity is obtained by the first illumination light. The "predetermined light intensity" means the minimum level necessary for visual recognition by pedestrians or drivers of other vehicles based on a predetermined standard. Examples of the "predetermined standard" may include a technical standard or a regulation.

The illumination range A2 is positioned outside the illumination range A1. The expression "outside the illumination range A1" means the outside with respect to the upper side, lower side, left side, and right side of the illumination range A1. A part of the illumination range A2 may overlap with the illumination range A1.

The first optical system and the second optical system are configured such that a first illumination standard is satisfied by the first illumination light and the second illumination light. Examples of the first illumination standard may include a technical standard or a regulation with respect to the illumination by the marker lamp during normal running.

In a case of the illumination by the marker lamp including a plurality of light sources, a second illumination standard is generally present, which is applied when turning-on of some of the plurality of light sources is disabled. Examples of the second illumination standard may include a technical standard or a regulation for prescribing illumination that is able to allow running continuation of a vehicle even if the turning-on of some of the plurality of light sources is disabled. The present inventor has found that occasions of repair or replacement of the marker lamp mounted on a vehicle may be reduced by using the second illumination standard.

As described above, the right marker lamp 6 includes the first optical system and the second optical system. The first optical system and the second optical system are configured such that the first illumination standard applied during normal running is satisfied by the first illumination light and the second illumination light. Meanwhile, the first optical system is configured such that the second illumination standard is satisfied by the first illumination light only. The controller 68 is configured to allow the turning-on of the light sources 61 to 64 when the turning-on of the light source 65 is disabled. Meanwhile, the controller 68 is configured to prohibit the turning-on of the light source 65 when the turning-on of any one of the light sources 61 to 64 is disabled.

That is, focusing on the second illumination standard, the present inventor divided the optical system included in the right marker lamp 6 into the first optical system and the second optical system, and configured the first optical system such that the second illumination standard was satisfied by the own illumination light (the first illumination light) only. Therefore, even if the turning-on of the light source 65 constituting the second optical system emitting the second illumination light is disabled, it is not necessary to immediately prohibit the turning-on of the light sources 61 to 64 constituting the first optical system. As long as the light sources 61 to 64 are able to be lighted on, the running continuation of the vehicle based on the second illumination standard is still allowed afterward. Therefore, even if the turning-on of the light source 65 is disabled, it is not necessary to uniformly prohibit the turning-on of the light sources 61 to 64. Accordingly, the opportunities of repair or replacement of the right marker lamp 6 may be reduced. When turning-on of any one of the light sources 61 to 64 is disabled, none of the first illumination standard and the second illumination standard is satisfied. Therefore, the turning-on of the light source 65 constituting the second optical system is immediately prohibited. In this case, the right marker lamp 6 will be repaired or replaced.

Figure 3:
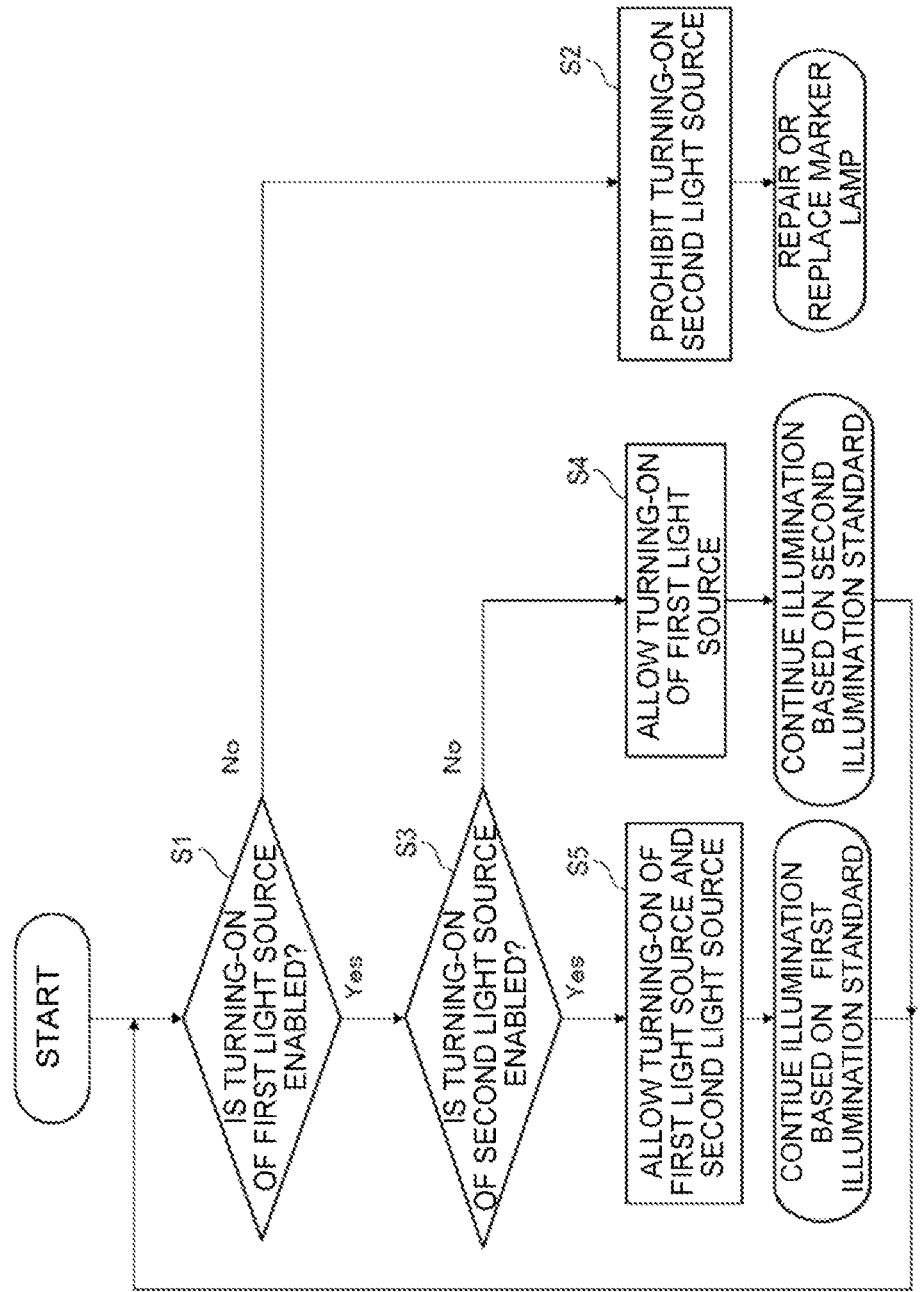
FIG. 3 is a view illustrating an exemplary operation flow of a controller provided in the marker lamp.

When the controller 68 performs the operations as described above, the operations may be implemented in a hardware manner by a wiring configuration of a circuit or in a software manner by a predetermined algorithm. FIG. 3 illustrates an exemplary flow of the process performed when the operations of the controller 68 is implemented in a software manner.

First, it is determined whether turning-on of all the light sources 61 to 64 (an exemplary first light source) is enabled (step S1). When it is determined that turning-on of any one of the light sources 61 to 64 is disabled ("No" in step S1), the turning-on of the light source 65 (an exemplary second light source) is prohibited (step S2). In this case, since none of the first illumination standard and the second illumination standard is satisfied, the right marker lamp 6 will be repaired or replaced.

When it is determined that turning-on of all the light sources 61 to 64 is enabled ("Yes" in step S1), it is determined whether the turning of the light source 65 is enabled ("step" S3). When it is determined that the light source 65 is unable to be lighted on ("No" in step S3), the turning-on of the light sources 61 to 64 is allowed (step S4). In this case, the right marker lamp 6 continues the illumination based on the second illumination standard. The process returns to step S1.

When it is determined that the turning-on of the light source 65 is enabled ("Yes" in step S3), the turning-on of the light sources 61 to 65 is allowed (step S5). In this case, the right marker lamp 6 continues the illumination based on the first illumination standard. The process returns to step S1.

How to divide the first optical system and the second optical system included in the right marker lamp 6 may be appropriately determined based on the first illumination standard and the second illumination standard to be satisfied. In the present exemplary embodiment, the first optical system and the second optical system are configured based on a guideline described below.

The first optical system and the second optical system are configured such that the maximum light intensity of the first illumination light is higher than the maximum light intensity of the second illumination light. Therefore, as illustrated in FIG. 2, a distance where the illumination range A1 reaches is longer than a distance where the illumination range A2 reaches. The "distance" may be, for example, a distance from the driver's seat of the vehicle on which the right marker lamp 6 is mounted.

Further, the first optical system and the second optical system are configured such that the illumination range A2 becomes wider than the illumination range A1, in a horizontal direction. The "horizontal direction" means a direction where a plane, which includes the right-left direction and the forward-backward direction of the vehicle on which the right marker lamp 6 is mounted, extends.

According to the above-described configuration, the illumination range A1 arranged inwardly from the illumination range A2 may be extended to a more distant place toward the front of the vehicle on which the right marker lamp 6 is mounted. In other words, the first illumination light may be visually recognized by a person positioned in a place more distant from the vehicle. Further, the illumination range A2 arranged outwardly from the illumination range A1 may be widened in a wider range in the right-left and the forward-backward direction of the vehicle on which the marker lamp is mounted. In other words, the second illumination light may be visually recognized by a person positioned in a wider angle range around the vehicle. Accordingly, in a case where the second illumination standard focuses on a visibility in a distant place, the second illumination standard may be easily satisfied by the first illumination light only. Therefore, the opportunities of repair or replacement of the right marker lamp 6 may be further reduced.

Figure 4:
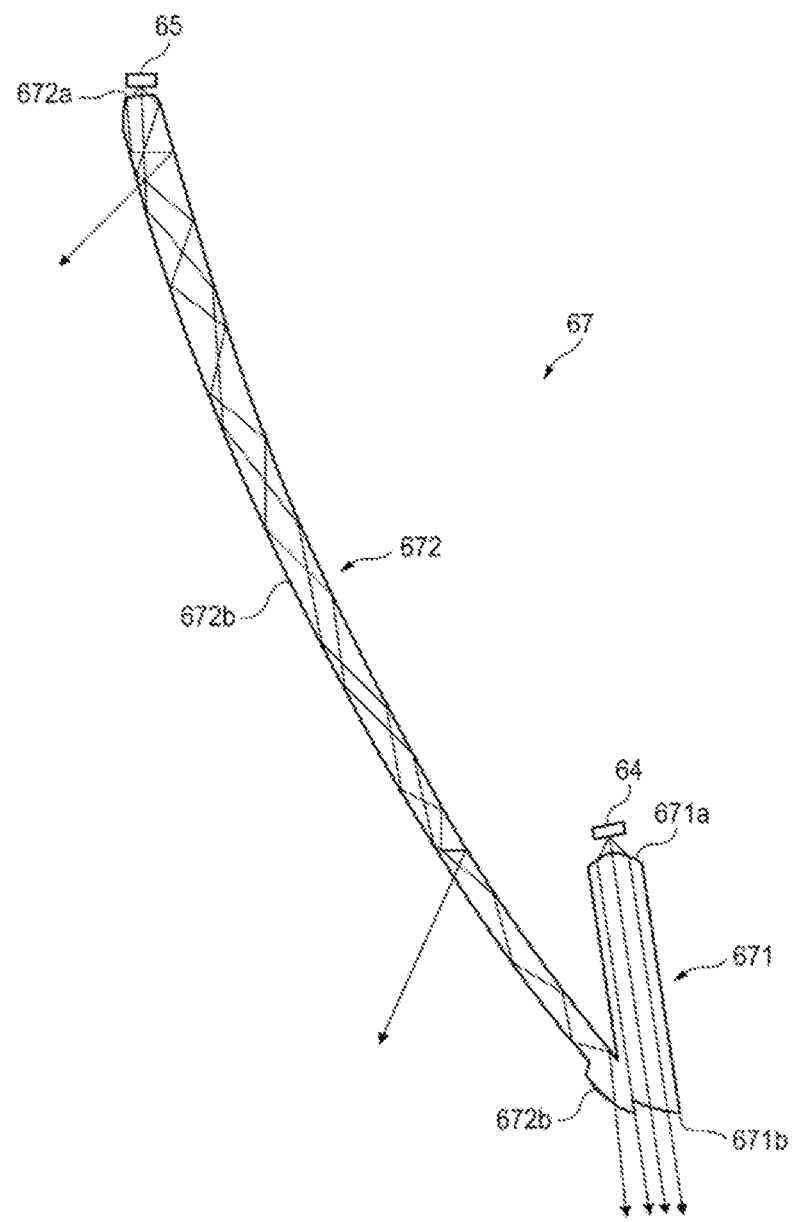
FIG. 4 is a view illustrating an exemplary second light guide provided in the marker lamp.

Next, a detailed configuration of the second light guide 67 will be described with reference to FIG. 4. FIG. 4 is a cross-sectional view taken along line IV-IV of FIG. 1.

As described above, the second light guide 67 includes the first portion 671 and the second portion 672. The first portion 671 includes a first incident surface 671a and a first emitting surface 671b. The second portion 672 includes a second incident surface 672a and a second emitting surface 672b.

The first incident surface 671a is arranged such that the light emitted from the light source 64 is incident thereon. The first incident surface 671a is formed as a lens surface that converts the incident light into a parallel light. Therefore, the first portion 671 is configured such that 50% or more of the light incident from the first incident surface 671a is emitted from the first emitting surface 671b without going through internal reflection. Further, the first portion 671 may be configured such that 80% or more of the light incident from the first incident surface 671a is emitted from the first emitting surface 671b without going through internal reflection.

The second incident surface 672a is arranged such that the light emitted from the light source 65 is incident thereon. The second portion 672 is configured such that 50% or more of the light incident from the second incident surface 672a is emitted from the second emitting surface 672b through internal reflection. Further, the second portion 672 may be configured such that 80% or more of the light incident from the second incident surface 672a is emitted from the second emitting surface 672b through internal reflection.

According to the above-described configuration, the light incident on the first incident surface 671a may be efficiently emitted from the first emitting surface 671b. Further, the directivity of the light emitted from the first emitting surface 671b may be enhanced. Meanwhile, the light incident on the second incident surface 672a is emitted from the second emitting surface 672b so as to be widely diffused. That is, a light guide capable of emitting two kinds of illumination lights having different properties may be configured. The light emitted from the first emitting surface 671b is suitable for use as the first illumination light described above. The light emitted from the second emitting surface 672b is suitable for use as the second illumination light described above. Accordingly, the second light guide 67 may contribute to the reduction of the opportunities of repair or replacement of the right marker lamp 6.

As illustrated in FIG. 4, the light source 64 is arranged to face the first incident surface 671a. When the light source 64 is realized by a semiconductor light emitting element, the light source 64 is arranged such that the light emitting surface faces the first incident surface 671a.

According to the above-described configuration, since the light emitted from the light source 64 is easily incident directly on the first incident surface 671a, the utilization efficiency of the light emitted from the light source 64 is increased. This enables light with high brightness and high directionality to be emitted from the first emitting surface 671b. Such light is suitable for use as the first illumination light described above. Therefore, the second light guide 67 may contribute to the reduction of the opportunities of repair or replacement of the right marker lamp 6.

Figure 5:
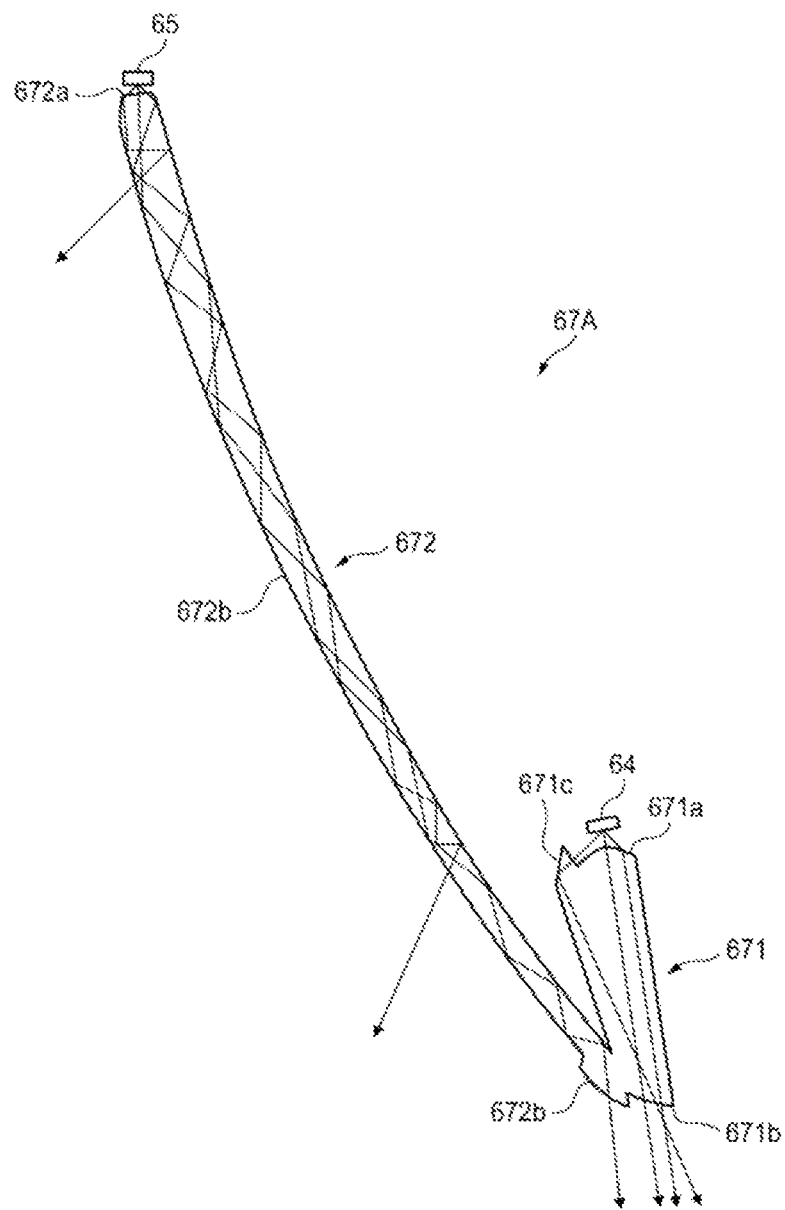
FIG. 5 is a view illustrating another exemplary second light guide provided in the marker lamp.

Similarly to a second light guide 67A according to a modified embodiment illustrated in FIG. 5, the first portion 671 of the second light guide 67 may be configured to include a reflective surface 671c that internally reflects at least a part of the light that is emitted from the light source 64 but is not incident on the first incident surface 671a, toward the first emitting surface 671b. At least a part of the light reflected by the reflective surface 671c is emitted from the first emitting surface 671b.

According to the above-described configuration, the utility efficiency of the light emitted from the light source 64 may be further increased. This enables light with higher brightness to be emitted from the first emitting surface 671*b*. Such light is suitable for use as the first illumination light described above. Therefore, the second light guide 67 may contribute to the reduction of the opportunities of repair or replacement of the right marker lamp 6.

In the exemplary embodiments described above, the first optical system includes the light sources 61 to 64, the first light guide 66, and the first portion 671 of the second light guide 67. However, as long as the first illumination standard is satisfied together with the second optical system and the second illumination standard is satisfied only with the first optical system, the number, shape, or arrangement of the light sources or the light guides may be appropriately determined. For example, both the first optical system and the second optical system may be configured only with the second light guide 67.

In the exemplary embodiments described above, the light source 64 is arranged to face the first incident surface 671*a* in the first portion 671 of the second light guide 67. However, if the light emitted from the light source 64 is able to be incident on the first incident surface 671*a*, an appropriate optical member for changing the traveling direction of the light may be arranged on an optical path that connects the light source 64 and the first incident surface 671*a*.

In the exemplary embodiments described above, the light source 65 is arranged to face the second incident surface 672*a* in the second portion 672 of the second light guide 67. However, if the light emitted from the light source 65 is able to be incident on the second incident surface 672*a*, an appropriate optical member for changing the traveling direction of the light may be arranged on an optical path that connects the light source 65 and the second incident surface 672*a*.

In the exemplary embodiments described above, the first incident surface 671*a* in the first portion 671 of the second light guide 67 is formed as a lens surface that converts the incident light into a parallel light. However, if 50% or more of the light incident from the first incident surface 671*a* is able to be emitted from the first emitting surface 671*b* without going through internal reflection, the optical configuration of the first incident surface 671*a* may be appropriately determined.

In the exemplary embodiments described above, at least a part of the light that is emitted from the light source 64 but is not incident on the first incident surface 671*a* in the first portion 671 of the second light guide 67 is internally reflected by the reflective surface 671*c*, which is a part of the first portion 671, and is directed toward the first emitting surface 671*b*. However, if the light that is emitted from the light source 64 but is not incident on the first incident surface 671*a* is able to be reflected toward the first emitting surface 671*b*, the reflective surface may be formed separately from the first portion 671.

Figure 6:
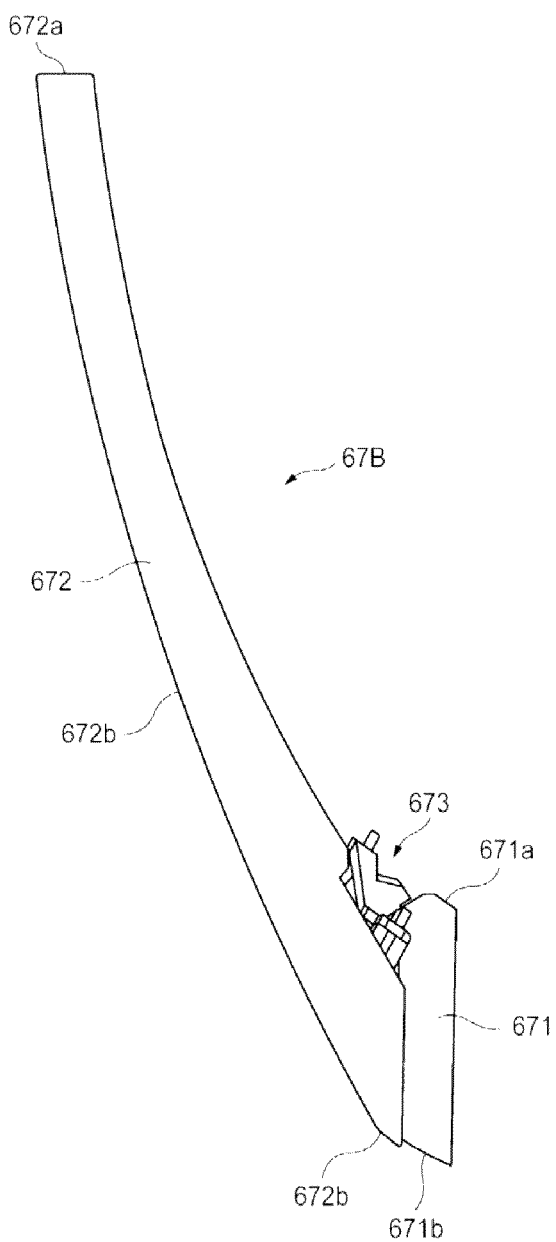
FIG. 6 is a view illustrating still another exemplary second light guide provided in the marker lamp.

In the exemplary embodiments described above, the first portion 671 and the second portion 672 of the second light guide 67 are formed as an integrally shaped article. However, similarly to a second light guide 67B according to a modified exemplary embodiment illustrated in FIG. 6, the first portion 671 and the second portion 672 may be shaped as independent optical components.

According to the above-described configuration, an independent optical control is facilitated in the first portion 671 and the second portion 672. Therefore, a light guide capable of emitting two kinds of illumination lights having different properties may be easily configured. When the first portion 671 is configured such that the light emitted from the first emitting surface 671*b* is suitable for use as the first illumination light described above, and the second portion 672 is configured such that the light emitted from the second emitting surface 672*b* is suitable for use as the second illumination light described above, the second light guide 67B may contribute to the reduction of the opportunities of repair or replacement of the right marker lamp 6.

In the second light guide 67B, the first portion 671 and the second portion 672 are mechanically coupled through a caulking portion 673.

According to the above-described configuration, the first portion 671 and the second portion 672 may be easily coupled while suppressing the optical interference of both portions, as compared with a case where the first portion 671 and the second portion 672 are coupled by, for example, adhesion. Therefore, a light guide capable of emitting two kinds of illumination lights having different properties may be more easily configured.

If the first portion 671 and the second portion 672 are able to be mechanically coupled, any appropriate fastening means other than the caulking portion 673 is also available.

In the exemplary embodiments, a clearance light was exemplified as an example of the marker lamp mounted on a vehicle. However, the present disclosure is applicable to a marker lamp such as, for example, a turn light, a stop light, a tail light, or a rear combination light.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A marker lamp mounted on a vehicle, comprising:
a first optical system including a first light source and configured to emit a first illumination light;
a second optical system including a second light source and configured to emit a second illumination light; and
a controller configured to control turning-on/off of the first light source and the second light source,
wherein at least a part of an illumination range where a predetermined light intensity is obtained by the second illumination light is positioned outside an illumination range where the predetermined light intensity is obtained by the first illumination light,
the first optical system and the second optical system are configured such that a first illumination standard is satisfied by the first illumination light and the second illumination light,
the first optical system is configured such that a second illumination standard is satisfied by the first illumination light, and
the controller is configured to allow the turning-on of the first light source when the turning-on of the second light source is disabled, and prohibit the turning-on of the second light source when the turning-on of the first light source is disabled.

2. The marker lamp of claim 1, wherein a maximum light intensity of the first illumination light is higher than a maximum light intensity of the second illumination light, and
the illumination range where the predetermined light intensity is obtained by the second illumination light is wider than the illumination range where the predetermined light intensity is obtained by the first illumination light, in a horizontal direction.

3. The marker lamp of claim 1, wherein the first optical system further includes a first portion of a light guide, and the second optical system further includes a second portion of the light guide, the first portion includes a first incident surface and a first emitting surface, the second portion includes a second incident surface and a second emitting surface, the first incident surface is arranged such that light emitted from the first light source is incident thereon, and the second incident surface is arranged such that light emitted from the second light source is incident thereon.

4. The marker lamp of claim 3, wherein the first portion is configured such that 50% or more of the light incident from the first incident surface is emitted from the first emitting surface without going through internal reflection, and the second portion is configured such that 50% or more of the light incident from the second incident surface is emitted from the second emitting surface through internal reflection.

5. The marker lamp of claim 3, wherein the first light source is arranged so as to face the first incident surface.

* * * * *